No. 607,526. Patented July 19, 1898.
G. H. F. SCHRADER.
PNEUMATIC TIRE OR OTHER VALVE.
(Application filed June 4, 1896.)
(No Model.)
FIG. 1.     FIG. 2.     FIG. 3.
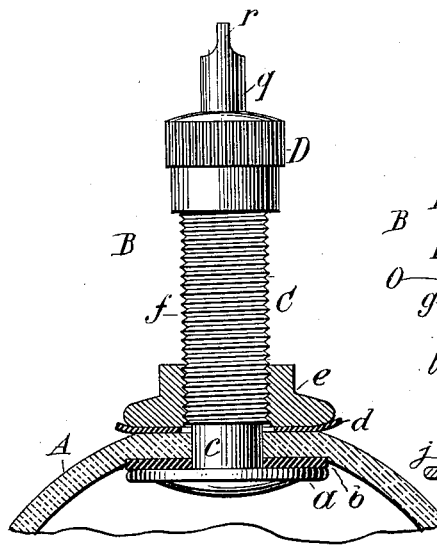
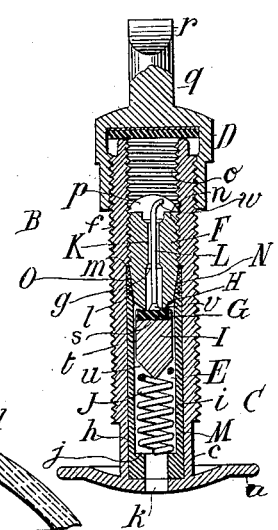
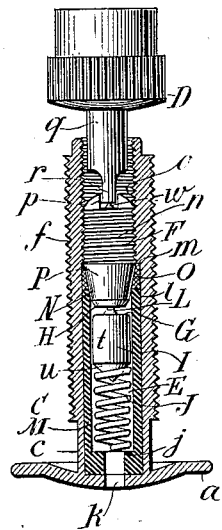
FIG. 5.    FIG. 4.    FIG. 6.
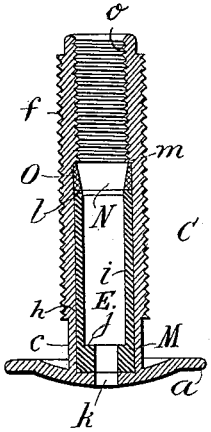
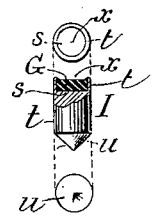
FIG. 7.          FIG. 8.
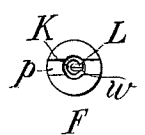
FIG. 9.          FIG. 10.
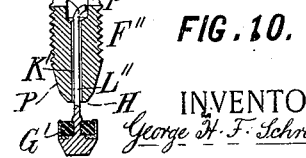
WITNESSES:
Fred White
Thomas F. Wallace
INVENTOR:
George H. F. Schrader,
By his Attorneys,

UNITED STATES PATENT OFFICE.

GEORGE H. F. SCHRADER, OF NEW YORK, N. Y.

PNEUMATIC-TIRE OR OTHER VALVE.

SPECIFICATION forming part of Letters Patent No. 607,526, dated July 19, 1898.

Application filed June 4, 1896. Serial No. 594,263. (No model.)

*To all whom it may concern:*

Be it known that I, GEORGE H. F. SCHRADER, a citizen of the United States, residing in the city, county, and State of New York, have invented certain new and useful Improvements in Pneumatic or other Valves, of which the following is a specification.

This invention relates to tire and other valves, and aims to provide certain improvements especially applicable to valves for the pneumatic tires of bicycles and for analogous uses.

Tire-valves are generally constructed of extremely small diameter, so that the hole for the valve through the felly of the wheel shall not materially weaken the felly. Owing to the danger of impairment of the working parts of the valve it is frequently necessary to gain access to these parts. Such access is best to be had from the outer or cap end of the valve, the other end being held in or, in the case of shoe-valves, passed into the tire, so that much trouble in detaching the valve would be necessary in order to get at the parts from the tire end. To give access at the outer end, valve-casings have been made in two parts coupled together by a union holding the outer or seat part on the inner or chamber part, and they have been made with an outer chamber part and an inner plug carrying the seat and screwing into this part. The two-part valves require separation of the outer part to permit passage of the chamber member through the felly, which separation endangers escape and loss of the minute inner working parts. The internal plug-valves are difficult to form with a leak-tight joint at the screw-thread connection between the plug and shell.

My present improvements are designed to provide a valve which may be of small caliber, cheap, simple, and compact construction, easy of manipulation, and which will be effective to prevent leakage at either the seat or joints, and while insuring against escape of the working parts will give ready access thereto.

To this end in carrying out my invention in its preferred form as applied to a shoe-valve I provide the shell or chamber member and a separate closing or seat member separably coupled therein, an improved packing provision or provisions between the shell and seat members, an improved construction of shell member, an improved valve and plunger therefor, improved deflater, and certain other features of improvement which will be hereinafter more fully set forth. The shell member is preferably constructed with differential walls, the seat member with tapering or seating faces wedging into tight contact with the shell member, the valve as a flat disk of packing material disconnected to other parts than the plunger, which is a metal guiding-block between the spring and valve, making a close but not tight fit with the chamber, and the deflater is coupled to the seat member, all the parts being so arranged that by uncoupling the latter all can be removed.

In the accompanying drawings, Figure 1 is a side elevation of a tire-valve, the tire being shown fragmentarily in section. Fig. 2 is an axial section of the valve in the closed position. Fig. 3 is a similar section showing the valve in the deflating position. Fig. 4 is a similar section of the shell member alone. Fig. 5 is an edge and face view of the valve proper. Fig. 6 is a top, side, and end view of the plunger, partly broken out. Fig. 7 is a top view of the seat member or plug and the deflater. Fig. 8 is a bottom plan view thereof, and Figs. 9 and 10 are axial sections of modified constructions of plug and deflater.

The construction shown in Figs. 1 to 8 of the drawings comprises the preferred form of my invention, which will first be described in detail.

Referring to the drawings, let A indicate the tire; B, the valve as a whole; C, the shell member thereof; D, the cap thereof; $a$, the shoe of the valve within the tire; $b$, a washer between this shoe and the tire; $c$, a contracted neck above the shoe, embraced by the tire; $d$, an outer washer against the tire; $e$, a nut pressing against this washer and screwing on the outer thread $f$ of the shell C to clamp the valve to the tire. The thread $f$ extends throughout the length of the shell C and is engaged by the cap D to screw the latter on the shell. As thus far described the parts are of usual construction, and for those shown any suitable or desired parts may be substituted.

According to the preferred form of my present invention I construct the valve with a valve-chamber E and a removable plug or seat member F, separably connected to the shell, removable through the outer end thereof, and provide improved means for preventing leakage and making a tight joint between the shell and plug, an improved construction of shell, plug, valve, plunger, and deflater. The valve proper, G, acts against a valve-seat H on the plug F and is held thereagainst by a plunger I, which is acted against by a spring J within the chamber E. The plug has a duct K traversing it and furnishing communication from the exterior to the seat, which duct preferably has an enlargement $g$ near the seat end, and when a deflater is used the latter extends loosely through the duct from the seat to the outer end thereof. A deflater L is shown in the drawings, which is normally inactive, resting upon the valve, but when pushed inwardly against the latter serves to unseat the valve and permit egress of air. The deflater is shown in its inward or active position in Fig. 3.

The shell is preferably constructed with double walls, preferably of different material, surrounding the chamber E, and with a tapering wall opposite and engaging a like wall on the plug F for making a leak-tight joint between the plug and shell. At its tapering portion the casing is preferably constructed with an inner wall of a different material, preferably a suitable packing material. The inner wall M of the casing is preferably of lead or other soft or suitable metal or material, having a cylindrical exterior, making a tight fit with the inner wall $h$ of the shell at its sides, having a cylindrical interior $i$, constituting the wall of the valve-chamber E, and having a shoulder $j$ at the bottom, against which the spring J acts, from which shoulder a duct $k$ extends through the shoe of the valve. The inner wall M of the shell extends to and slightly beyond the lower end of the tapering wall N of the shell and preferably terminates in a shoulder $l$, from whence rises a second inner wall O of a different material, preferably an annular leather ring or a ring of other suitable material, which is cylindrical externally, and there fits the wall $h$ of the shell and is tapering internally, and there constitutes part of the tapering wall N of the shell and terminates at top at a shoulder $m$, constituting the upper end of the wall $h$ of the shell. The plug F is best coupled to the shell by means of an external screw-thread $n$ on the plug engaging an internal thread $o$ in the shell, these threads being preferably of slightly less diameter than the wall $h$ of the shell and terminating at the shoulder $m$ of the latter. The plug is constructed with a tapering or seating face P, which makes intimate contact with the tapering or seating face N of the shell, engaging both the walls M and O thereof and wedging against these walls with great tightness as the plug is screwed into the shell. The inner wall M makes a tight joint with the plug when engaged thereby, and its shoulder $l$ assists in confining the additional wall O against the possibility of displacement under the action of the plug. Either of these walls will suffice to make a leak-tight joint around the plug, but both are preferably used to obtain the greatest security. The space between the shoulders $l$ and $m$ and the wall $h$ constitutes a confined annular groove for the material of the wall O.

The plug may have any suitable seat H, that shown being a segment of a cone, serving as an annular seat surrounding the duct K. The plug is preferably provided with a screw-slot $p$ by inserting a screw-driver, in which the plug can be connected to or disconnected from the shell or adjusted therein. To facilitate manipulation of the plug, I prefer to provide the cap D with an elongated finger $q$, having a screw-driver end or point $r$, which when the cap is removed can be inserted in the shell and into the notch $p$ to operate the plug.

The valve proper, G, is preferably a flat thin cylindrical disk, of rubber or other suitable packing material, fixed to a plunger L and therewith freely movable and disconnected from all other parts of the valve, being guided by the walls of the valve-chamber, and of such size that while it is capable of some lateral movement it cannot move so far as to entirely escape the seat. Its ability to move freely laterally enables it to seat in different positions at different times, thus varying its point of contact with the seat and prolonging its life.

The plunger I is preferably an elongated and substantially cylindrical bar of metal or other suitable material having a flat top face $s$, cylindrical sides $t$, and a tapering bottom end $u$. The latter fits within and guides and is guided by a spring J, while the side walls $t$ make a close guiding fit, but not a leak-tight fit, with the cylindrical walls $i$ of the chamber E, so that the plunger is well guided within the chamber, but does not prevent a suitable flow through the latter. The top face $s$ of the plunger is preferably flat or corresponds in shape with the bottom face of the valve G and bears against the latter to press it against the seat. The plunger is disconnected to any part, except the valve G, and its walls $t$ rise above and overlap the latter, forming a socket $x$, in which it is fixed.

The spring J when used may be any suitable coiled spring or other elastic medium, reacting against the plunger or valve to hold the latter toward its seat.

The deflater L may be any suitable deflater; but according to my present improvements I prefer to construct it as shown, connecting it irremovably to the plug F and so arranging it that it must be operated to deflate the valve during the operation of removing, applying, or adjusting the plug. The deflater shown is connected to the plunger against outward removal by having a shoulder or enlargement $v$ formed on its inner end, which by contacting with the shoulder $g$ in the plug will prevent its outward withdrawal. The outer end of the deflater, if it is desired to inseparably couple it to the plunger, may be of any suitable construction, a simple expedient for this purpose being the lateral bending of the end to form a shoulder or head $w$, which will not pass through the duct K. To insure operation of the deflater, its outer end or head is preferably disposed within the notch $p$, so that insertion of the screw-driver $r$ will necessitate inward movement of the plunger, (shown in Fig. 3,) this movement being sufficient to unseat the valve, so that it will be deflated before the plug is entirely unscrewed, thus avoiding danger of blowing out the valve when the plug is removed, which might result in the loss of some of the parts. The deflater is shown as a simple metal bar of triangular cross-section having a laterally-bent outer end and a slightly-upset inner end, the outer end being bent after the deflater is passed through the plug.

In use the valve may be originally assembled and may be applied to the tire when required in the usual way. To then place the tire over a felly, the cap D will be unscrewed, thus reducing the valve to its minimum diameter, so that the shell can be passed through a valve-hole in the felly, which hole need be no larger than the outer diameter of the thread $f$. The cap D can then be returned to its position on the shell, and the valve is complete and in condition for use without having had any of its internal parts removed or in any manner disarranged by its application to the wheel. Should it be necessary to deflate the valve, this can be done by pressing the end of the screw-driver therein, as shown in Fig. 3, or by using any other small implement for this purpose. To adjust the valve, any screw-driver can be inserted, as that on the cap D. If necessary to get at the working parts, the plug will be unscrewed, whereupon the valve, plunger, and spring will fall out and can be cleaned or renewed before replacing. Return of the plunger again will make the valve ready for use. When the plug is removed, the connection of the deflater to it will avoid the loss of the latter. The construction of the valve G permits its convenient renewal, it simply being necessary to detach it from the plunger I, as by picking it out from the socket $x$ thereof until its edges escape from beneath the inturned top of the surrounding wall $t$, after which a new disk can be pressed into place. This wall will prevent distortion of the disk, and a slight looseness of the plunger will avoid seating of the disk in exactly the same position each time, thus slightly varying its seating-face and distributing the wear. Should the center of the disk become injured, the imperforate top face of the plunger pressing against the bottom face of the disk will prevent leakage until the disk can be replaced and will receive the inner end of the deflater should the disk be entirely cut through opposite the latter.

It will be seen that my invention provides various features of improvement in valves which can be readily and advantageously availed of, and it will be understood that the invention is not limited to the particular details of construction, arrangement, combination, and use of the parts shown and described as constituting the preferred form of the invention, since the invention can be utilized in whole or in part according to such modifications in any of these respects as circumstances or the judgment of those skilled in the art may dictate without departing from the spirit of the invention.

In Fig. 9 a slightly-modified construction of plug F' is shown in section, and a modified arrangement of deflater L' is shown in its inward position therein. The screw-notch $p$ here has a larger central bore $p'$, receiving the enlarged outer end $w'$ of the deflater and preventing the cylindrical head $v'$ thereof from entirely leaving the inner socket $g'$ of the plug. The outer head $w'$ is in the path of the notch, so that it must be depressed by the insertion of a screw-driver therein, as before described, and the parts are also so connected that accidental separation is avoided.

In Fig. 10 the plug F'' is in all respects similar to that shown in Fig. 9 except that its duct K' is of uniform diameter from its inner end to the point where it meets the enlargement $p'$, and the deflater L'' is here connected to the valve G', being part of the stem thereof at its inner end, while at its outer end it has a head or portion $w''$ within the socket $p'$ or the notch $p$, which head serves to irremovably couple both the deflater and the valve to the plug and by projecting into the notch is in position to be moved inward by the insertion of a tool into the latter.

What I claim is, in tire and other valves, the following-defined novel features and combinations, substantially as and for the purpose hereinbefore set forth, namely:

1. In valves, a shell member having double walls of different materials and a valve-chamber within said walls, in combination with a seat member carried by said shell member, having an annular face seating against the inner wall thereof and having a seat within said chamber, and a valve proper in said chamber seating against said seat.

2. In valves, a shell member having a valve-chamber, and a hard outer wall and an inner wall of relatively soft material, surrounding said chamber, in combination with a seat member separably coupled to said shell member, passing within and making a leak-tight joint with said soft wall, and having a valve-seat inwardly of said joint and within said chamber, and a valve proper in said chamber controlling communication through said parts.

3. In valves, a shell member having a valve-chamber, an internal annular seating-face beyond the latter and inwardly of the outer end of the shell and a screw-thread beyond said face, in combination with a seat member screwing into said shell, having a screw-thread engaging the thread thereof, an external annular face passing through and fitting said face thereof with a leak-tight joint, and having inwardly of said joint a valve-seat inwardly of said face, one of said parts having an annular groove opposite said faces an annular ring of relatively soft material in said groove and engaged by the face of the other part, said ring inwardly of the outer end of said shell, outwardly of said seat and exposing the latter, and a valve proper in said chamber engaging said seat.

4. In valves, a shell member, having a valve-chamber, an outer screw-thread, and having inwardly of its outer end, and intermediate of said parts, an internal annular tapering wall O, in combination with a seat member within said shell, having a seat in said chamber, having outwardly thereof and inwardly of the outer end of the shell, an annular tapering peripheral face passing into said chamber, through and making a leak-tight joint with said wall O, and having an outer screw-threaded portion engaging the thread of said shell, and a valve proper closing on said seat.

5. In valves, a shell having an inner wall M and a tapering face O, in combination with a seat member having a tapering face P making a leak-tight joint with said face M, and having a seat at its inner end, and a valve engaging said seat.

6. In valves, a shell C, having inner walls M and O, and screw-thread o, in combination with a plug F having a seat H, making a leak-tight joint with the walls of said shell, and having a thread n screwing into the thread o of the shell, and a valve proper engaging said seat.

7. In valves, a shell having a relatively small inner valve-chamber, an outwardly-flaring wall beyond the latter, and a screw-thread of greater diameter than said chamber and beyond said wall, in combination with a plug having a small annular seat within said chamber, an outwardly-flaring wall extending from said seat, and a large screw-threaded portion beyond said wall and screwing into the thread of said shell, and a valve proper in said chamber and removable therefrom through the outer end of said shell.

8. In valves, a screw-threaded tubular shell adapted to be clamped to a tire and having a valve-chamber, and a valve proper therein, in combination with a tubular plug removably fitting within said shell, removable through the outer end thereof, and having a seat therein engaged by said valve proper, and a deflater extending through and carried by said plug for unseating said valve, movable independently of and disconnected from said valve, and movable relatively to said plug, and removable therewith and inseparable therefrom, and a screw-threaded connection between said shell and plug.

9. In valves, a shell, and a valve proper therein, in combination with a removable tubular plug F, fitting within and removable through the outer end of said shell, and a deflater L, removable with and carried by, and permanently and irremovably connected to, said plug.

10. In valves, a shell, and a valve proper, in combination with a separable plug screwing entirely into and removable through the outer end of the shell, and having a seat opposite the valve proper and a notch p at its other end, and there exposed and free to receive a screw-driver, and a deflater carried by said plug and projecting into, and terminating at its outer end within, said notch, whereby said deflater must be operated when the screw-driver is inserted in said notch to unscrew said plug.

11. In tire and like valves, a shell having an inner valve-chamber and an outer screw-threaded socket communicating with said chamber and free to receive the end of a screw-driver, in combination with a tubular plug screwing entirely into said socket from its outer end closing one end of said chamber, having a valve-seat at the inner end of said plug, having a freely-exposed and unobstructed outer end within said socket, having a notch exposed and free to receive a screw-driver at its outer end, and a conduit from said seat to the outer end of said plug, a valve proper in said chamber retained therein by said plug and engaging said seat, removable through said socket when said plug is removed, and a stem extending through said conduit from said valve proper to the outer end of said plug and projecting, when said valve proper is seated, into the plane of said notch and freely movable inwardly with the valve proper, and when so moved permitting entrance of a screw-driver into said notch to adjust said plug, whereby a screw-driver can be applied to said plug without preliminary manipulation, and its application deflates such valve.

12. In tire-valves, a shell member, having an outer end, a screw-threaded socket in said end, a small valve-chamber inwardly of said socket, and an annular internal wall between said socket and chamber, in combination with a tubular seat member passing within the outer end of and removably coupled to said shell, and comprising a screw-threaded plug screwing entirely within said socket, and a valve-seat within said chamber, held therein by said plug, with a leak-tight joint at said annular wall of said shell, and a valve proper in said chamber and engaging said seat.

13. In tire and like valves, a shell member having a screw-threaded socket in its end, and a chamber inwardly of said socket, in combination with a tubular seat member having an external screw-threaded outer end, a valve-seat, and an inlet-duct, said seat member screwing into and passing entirely within the socket of said shell member and making a leak-tight joint therewith, a valve proper engaging said seat, and a deflating-stem for unseating the valve proper, extending through said member and projecting into said socket at the outer side thereof.

14. For tire and other valves, a seat member consisting of a tubular plug having a valve-seat, an inlet-duct leading to said seat, an annular face for engaging the inner face of a tire-tube, an external screw-thread of greater diameter than said face for engaging the internal screw-thread of such tube, and a notch for a screw-driver in its outer end, said member adapted to screw entirely within the socket in the end of a tire-tube.

15. For tire and other valves, a seat member consisting of a tubular plug having a valve-seat, an inlet-duct leading to said seat, an annular face for engaging the inner face of a tire-tube, an external screw-thread of greater diameter than said face for engaging the internal screw-thread of such tube, and a notch for a screw-driver in its outer end, said member adapted to screw entirely within the socket in the end of a tire-tube, and a deflating-stem for a valve proper carried by said member.

16. In valves, a shell having an inner valve-chamber and an outer screw-threaded socket, in combination with a removable plug screwing into said shell from its outer end and having a seat in said chamber, and an inlet-conduit leading to said seat, and a valve proper in said chamber having a stem passing through said plug and permanently and irremovably coupled thereto.

17. In valves, a shell having a valve-chamber and a screw-thread at its outer end, in combination with a plug passing into said shell from its outer end, having a valve-seat in said chamber and an outer screw-thread screwing on that of the shell, a valve proper in said chamber, having a rigid stem traversing said plug and permanently and irremovably connected thereto.

In witness whereof I have hereunto signed my name in the presence of two subscribing witnesses.

GEORGE H. F. SCHRADER.

Witnesses:
GEORGE H. FRASER,
THOMAS F. WALLACE.